Patented June 28, 1949

2,474,227

UNITED STATES PATENT OFFICE 2,474,227

MAKING CARBOHYDRATE FOODS RESISTANT TO MICROORGANISMS

Gerald H. Coleman and Paul A. Wolf, Midland, Mich., assignors to The Dow Chemical Company, Midland, Mich., a corporation of Delaware No Drawing. Application January 13, 1947, Serial No. 721,877

14 Claims. (Cl. 99—91)

This invention relates to a method for imparting to foods rich in carbohydrates increased resistance to attack by microorganisms such as fungi, yeasts and bacteria, and to the so-treated products. It relates especially to a method for imparting such increased resistance to baked goods, and in particular to breadstuffs.

It is a matter of common knowledge and experience that foodstuffs rich in carbohydrates (i. e., those containing 50 per cent or more of carbohydrate based on the total weight of protein plus fat plus carbohydrate) are subject to attack by such varied types of microorganisms as fungi, yeasts and bacteria. The growth of such microorganisms is by no means universally injurious to the foodstuffs, but may give the food an unpleasant appearance or an unnatural flavor which may make the product unsalable or unpalatable to the consuming public. Various materials have been suggested as inhibitors of such uncontrolled growth of microorganisms in foods rich in carbohydrates, but none are as successful as may be desired. Some prior inhibitors are short-lived in their effect, and others require such high concentrations as to be uneconomical. Some are too selective for general use. Others contribute a distinct and undesirable flavor to foods. Some are toxic and cannot be used safely in foods for human consumption. Most of the prior inhibitors modify the pH of the foods, or require particular pH conditions for antimicrobial effectiveness, and this makes them difficult to use and to control.

Purely by way of illustrating the diversity of foodstuffs which are rich in carbohydrates and which are subject to attack by fungi, yeasts and bacteria, the following partial list is given: baked goods, including various wheat, rye and barley breads, cakes, cookies, crackers, oatmeal and oat flour breads and crackers, soya flour products, ginger bread, cornmeal products, rice flour products, and the like; prepared cereal foods, including the predominantly cereal animal foods; yams, potatoes, turnips, carrots, beans and other vegetables commonly stored for long periods; vegetable and fruit juices, including tomato juice, prune juice, apple juice, grape juice and the like; confections, candies, sweet chocolate such as "hot fudge sauce" and chocolate syrup, and the like; sorghum, molasses, maple sugar and syrup, corn syrup, cane sugar syrup, honey; carbonated and uncarbonated sweetened beverages containing fruit and root extracts; strawberries, grapes, citrus fruits, and the like; jams, jellies and preserves; and numerous others. It is not to be inferred that the foregoing and related foods are invariably attacked and made unacceptable for table use, but it should be understood that each of them is subject to such microbial attack and that the extent of the damage done will depend largely on the history of the particular product concerned, the conditions under which it is prepared and stored, and upon the kind and amount of antimicrobial agent, if any, with which it may be treated. In any case, it is desirable that a resistance to attack by microorganisms be imparted to foods rich in carbohydrates, and that the means employed be itself an odorless, tasteless, non-injurious, edible material.

It is accordingly among the objects of the present invention to provide a method for imparting to foods rich in carbohydrates an increased resistance to attack by microorganisms such as fungi, yeast and bacteria. A related object is to provide such a method, in which the means employed to impart the said resistance is an odorless material which is tasteless at use concentrations and is both non-injurious to the foods and edible by humans. A particular object is to provide a method for imparting to baked goods, especially to breadstuffs, an increased resistance to attack by microorganisms after the baking operation. Another object is to provide a method of using particular compounds to impart to carbohydrate-rich foods an improved resistance to attack by microorganisms. A further object is to provide carbohydrate foods having improved resistance to such attack.

The present invention is dependent upon the heretofore unknown and surprisingly high antimicrobial properties (as regards organisms whose growth is normally fostered by foods rich in carbohydrates) of the chemical compound known as dehydroacetic acid and its edible salts. Dehydroacetic acid, which has the structural formula

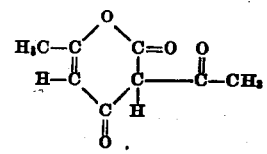

is also known as 3-acetyl 6-methyl pyrandione-2,4, and exists in both a keto and an enolic form. Dehydroacetic acid and its sodium, potassium, ammonium and calcium salts are non-hazardous to humans at use concentrations, and in the amounts usually employed are both tasteless and odorless. They are essentially neutral compounds, and do not affect materially the pH of foodstuffs in or on which they are employed in the invention. Dehydroacetic acid is slightly soluble in water and is readily soluble in alkalies and a variety of organic solvents, including ethyl alcohol and the glycols, and may be deposited from or used in such of these solutions as is deemed appropriate for the particular case. Dehydroacetic acid is slightly more effective (i. e., it may be used at slightly lower concentrations) in neutral or acid media than in an alkaline medium, and when high solubility in aqueous media is required, the neutral sodium salt is recommended.

The method of the invention may be defined as one for imparting to foods rich in carbohydrates an increased resistance to attack by microorganisms which comprises bringing into close association with such foods a compound selected from the class consisting of dehydroacetic acid and its edible salts. The term "edible salt" as herein used refers to those salts of dehydroacetic acid which may be ingested by humans in the small amounts present in foods containing them, without harmful effect. The requisite close association may be obtained by incorporating the dehydroacetic acid compound in the food, or by applying it to the exterior of the food, or by wrapping the food in a wrapper containing the compound, as may be most appropriate for the type of food to be treated. Owing to its moderately low volatility, the antimicrobial effect of dehydroacetic acid is of long duration, even in those cases in which it is applied externally of the food, and is exposed to the atmosphere. While the amount of dehydroacetic acid, or salt thereof, to be used may vary considerably, depending on the type of food to which it is to be applied and the conditions and microorganisms which the food may be expected to encounter, a significant measure of resistance to attack is found to be imparted to carbohydrate rich foods through the use of 0.01 to 0.5 per cent of dehydroacetic acid, based on the weight of food, and that fungus-repressing wrapping sheets need not contain over 10 per cent, and may conveniently contain less than 5 per cent by weight of dehydroacetic acid.

The following specific examples illustrate the practice of the invention, but are not to be construed as limiting the invention either to the foods specifically disclosed or to the microorganisms whose growth is shown to be repressed.

EXAMPLE 1

The antimicrobial spectrum of dehydroacetic acid has been determined to be very comprehensive. In the following table appear the results of tests in vitro to illustrate the relative effectiveness of dehydroacetic acid and some of the previously known antimicrobial agents against a few typical organisms. In each column, the first or left-hand numeral represents the maximum concentration of the antimicrobial agent which allows growth to proceed normally, while the second or right-hand numeral represents the minimum concentration which fully inhibits microbial growth on a suitable nutrient agar medium in a petri dish. Both values are given as a per cent by weight of the medium.

Table

| Organism | Microbistat, Per Cent | | | | | |
|---|---|---|---|---|---|---|
| | Dehydroacetic Acid | Dichloroacetic Acid pH 5 | Calcium Propionate pH 8 | Sodium Propionate pH 8 | Propionic Acid pH 5 | Benzoic Acid pH 6 |
| Penicillium digitatum | 0.01   0.025 | >5.0 | 3.0   5.0 | 3.0   5.0 | 0.1   0.25 | 0.1   0.5 |
| Saccharomyce cerevisiae | 0.01   0.025 | >5.0 | >7.5 | >7.5 | 0.75  1.0 | 0.25  0.50 |
| Penicillium expansum | 0.0075 0.01 | >5.0 | >7.5 | >7.5 | 0.25  0.50 | 0.1   0.25 |
| Aspergillus niger | 0.025  0.05 | >5.0 | >3.0 | >5.0   7.0 | 0.25  0.50 | 0.50  0.75 |
| Lactobacillus plantarum | 0.08   0.10 | 0.5   0.75 | >7.5 | >7.5 | 1.0   2.0 | 0.25  0.50 |
| Rhizopus nigricans | 0.01   0.025 | >5.0 | 5.0   7.5 | 3.0   5.0 | 0.25  0.50 | 0.25  0.50 |

Other organisms of numerous types respond in the same manner, and are controlled at similar concentrations of dehydroacetic acid. These include, for example, *Aerobacter aerogenes, Erwinia caratovora, Fusarium oxysporium, Phomopsis citrii, Sclerotium rolfsii, Bacillus mesentericus*, and the like. The foregoing table shows that dehydroacetic acid is usually at least as effective as ten times its weight of other representative commercial antimicrobial agents. Less of the dehydroacetic acid will be required in any particular application than of the other agents, and in some cases the other agents are not effective at any practical concentration.

EXAMPLE 2

Dehydroacetic acid was mixed in various proportions with whole-wheat flour. A standard bread dough was prepared from each of the mixtures. Since the tests in vitro reported in Example 1 had indicated that dehydroacetic acid easily inhibits growth of *S. cerevisiae*, the yeast used to leaven bread, there was concern as to whether the bread would rise, and if so, whether it would exhibit any practical degree of protection against *A. niger, R. nigricans,* and *B. mesentericus,* all common bread contaminants. It was found that at 0.3 per cent concentration, based on the weight of the baked loaf, dehydroacetic acid partially inhibited the growth of the yeast, and that the resulting loaf had some "flat" spots. At concentrations up to at least 0.2 per cent, dehydroacetic acid does not show any effect on the leavening action of the yeast. The baked loaves, including some containing no dehydroacetic acid, were each partially sliced, and were exposed continuously to the atmosphere at a temperature of 85° to 90° F., and a relative humidity of 90 to 100 per cent. These extreme conditions, most favorable to mold growth, produced heavy growths of mold on the untreated bread in two or three days. Amounts of dehydroacetic acid up to 0.06 per cent of the weight of the bread retarded but did not completely inhibit mold growth, while concentrations above about 0.10 per cent not only retarded but inhibited mildew, even under the rigorous conditions of the test, for as much as 14 days. Under the milder conditions of normal bread storage, the antimicrobial effect of dehydroacetic acid is even more prolonged, and the comparison with untreated bread is more favorable to the present agent, if that is possible. In no case was it possible to detect any difference in taste between the freshly baked treated and untreated loaves.

The seemingly preferential inhibition of mold, as compared with yeast, in bread, is probably due to the relatively small number of mold spores that gather on the bread and make it unacceptable for table use in comparison to the large yeast inoculum which is used in bread making. Enough of the yeast can grow to leaven the bread, but the mold contaminant is not permitted to mature.

Similar results obtain with "white" and with rye bread, inhibition resulting from the use of 0.08 per cent or more of dehydroacetic acid in the bread. Amounts greater than 0.2 per cent of the agent were not found necessary in any bread product, to obtain the required protection.

EXAMPLE 3

Various amounts of dehydroacetic acid were mixed with a commercial ready-mixed gingerbread powder. The directions supplied by the manufacturer were followed and the gingerbread was baked, cut, and then exposed for 14 days at 85° F. in an atmosphere having 90 to 100 per cent relative humidity. For comparison, a similar series of gingerbreads was prepared using calcium propionate as the additive, since it is being supplied commercially as a fungistat. The results are tabulated below:

| Antimicrobial Agent | Concentration, Per Cent of Baked Gingerbread | Appearance After 14 Days |
| --- | --- | --- |
| Dehydroacetic acid | 0.025 | Very moldy. |
| Do | 0.05 | Slightly moldy. |
| Do | 0.075 | No visible mold. |
| Calcium propionate | 0.1 | Very moldy. |
| Do | 0.5 | Do. |
| Do | 1.0 | No visible mold. |
| Do | 2.0 | Do. |
| None | (control) | Very moldy. |

Under identical conditions, dehydroacetic acid is seen to be about 10 times as effective as calcium propionate.

EXAMPLE 4

The neutral sodium salt of dehydroacetic acid, dissolved to the extent of 0.05 per cent by weight in fresh cider and apple juice effectively inhibited the growth of molds and of fermentation and oxidative organisms, and the product remained "sweet" and clear for a prolonged period. An untreated control, in the same period of time, developed a pellicle over its entire surface, and smelled strongly of vinegar.

EXAMPLE 5

Commercial samples of a thick chocolate "hot fudge syrup" and of a more fluid chocolate syrup, both of which were sweetened to be predominantly carbohydrate foods, and both of types which are used as ice cream additives, were treated with various amounts of dehydroacetic acid and were exposed to the atmosphere at 85° F. The untreated controls showed considerable mold growth on the exposed surfaces in a week. No such growth appeared in 20 days on the "hot fudge" samples containing 0.05 per cent or more of dehydroacetic acid, or on the chocolate syrup samples containing 0.03 per cent or more of dehydroacetic acid. Samples containing 0.01 per cent of the addition agent had less mold than the controls, but were not adequately protected.

EXAMPLE 6

Various commercial syrups used for sweetening purposes, including corn syrup (glucose), honey, maple syrup, molasses and cane sugar syrup are subject to the growth of contaminating molds. The same is true of the flavoring syrups used in confectionery, in carbonated beverages, and in ice cream products. The addition of 0.025 to 0.05 per cent by weight of dehydroacetic acid to such syrups effectively inhibits such growths and does not affect the flavor of the syrups. Thus, in one series of tests, a commercial molasses was inoculated with a small amount of moldy syrup, and was divided into several portions. One portion was set aside as a control and the others were treated with from 0.01 to 0.1 per cent by weight of dehydroacetic acid. A heavy growth of blue-white mold appeared in the control, while all samples containing 0.025 per cent or more of dehydroacetic acid remained free from mold.

EXAMPLE 7

Small fruits, and especially berries, are injured easily during picking and in transit to the consumer. When, as often happens, these fruits are exposed to a warm humid atmosphere for 3 days or more between harvest and consumption, they may become badly mildewed. Such growth appears to originate at and to spread from the injured spots. It has now been found that the contaminating growth of mildew can be minimized on strawberries, raspberries, blackberries, loganberries, huckleberries (blueberries), and the like, by dipping the freshly picked fruit in a solution of 0.1 per cent by weight of dehydroacetic acid in water. In one specific case, strawberries, which had been picked from 24 to 36 hours previously and which had not been refrigerated, were dipped in 0.05 and 0.1 per cent solutions of dehydroacetic acid. An untreated control was entirely blanketed with mildew after exposure to air at 85° F. for an additional 5 days, and the fruit was obviously decomposing. The berries treated with the 0.05 per cent solution had a few visible colonies of mildew, but smelled fresh and sweet. The berries dipped in the 0.1 per cent solution were substantially as fresh and edible as when purchased. When the treatment follows immediately after picking, the results are even more favorable.

EXAMPLE 8

Sliced loaves of commercial baker's bread were sealed in the usual manner in various types of bread wrappers. Some of the wrappers were untreated, others were purchased as being fungistatic, and the remainder were paper sheets which had been impregnated with 2 per cent by weight of dehydroacetic acid. The wrapped loaves were stored for 7 days at 85° F. in an atmosphere having about 90 per cent relative humidity. In external appearance the untreated control wrapped loaves had a heavy growth of black and blue-green molds, on their outer crusts, especially along the side, just under the crown. The loaves wrapped in the commercial "fungistatic" sheet had healthy growths of similar molds along their sides. The loaves wrapped with paper containing dehydroacetic acid showed no mold growth the crusts. Unsliced loaves, wrapped with the
paper containing dehydroacetic acid, are kept
free from mold both externally and internally.

EXAMPLE 9

Citrus fruits tend to develop blue-green molds, especially on bruised surfaces, during shipment and storage. Various coatings and wrappers have been suggested and employed to overcome this problem, but without the desired success. To determine the effectiveness of dehydroacetic acid for this purpose, lemons which had already been shipped cross-country were purchased in Michigan, their skins were abraded to provide a fresh wound, the lemons were then dipped in an aqueous synthetic rubber or elastomer latex and dried in warm air. The so-coated fruit was sprayed with a suspension of *Penicillium digitatum* spores, and was incubated in a moist chamber at a temperature favorable to mold development. Some of the lemons had been dipped in a latex containing no fungistat, while the rest were dipped in a latex containing 2 per cent of dehydroacetic acid, based on the total dispersed solids. The fruit which had no dehydroacetic acid in its coating was badly molded within a week after inoculation, while that which had this compound in its coating remained free from mold for the several weeks of its storage period.

EXAMPLE 10

It is a common practice to allow such products as fruit cake and plum pudding to "age" for from a few months to a year or more before they are eaten. Usually, such products are wrapped or packed in a cloth bag, or in several layers of paper. Sometimes the package is sealed by immersion in molten paraffin wax. Regardless of the type of wrapping, it often happens that these products, in storage, become covered with mold. While such mold may be merely superficial, it may also "strike" into and spoil the wrapped food. Two means of protection have now been found. In one method, 0.2 per cent of dehydroacetic acid may be incorporated in the ingredients of the fruit cake or plum pudding before baking or cooking, and mold growth on the wrapper does not penetrate into the packed product. In another method, the wrapping material is impregnated with from 1 to 5 per cent and usually not over 2 per cent by weight of dehydroacetic acid, and is dried. The so-treated wrapper remains free from mold growth, even when stored under conditions which foster mold growth on untreated packages of the same materials.

In addition to the common carbohydrate food contaminant organisms, specific examples of which are named hereinabove, various bacterial contaminants, some of which are pathogenic, may also be encountered in such foods, especially when the food is not handled under fully sanitary conditions. It is desirable, of course, to impart to the food a resistance to the growth of such organisms. It has been found that dehydroacetic acid has an antibacterial action on a variety of pathogenic bacteria, in vitro, and it can be expected to make foods containing or coated with it more resistant to the proliferation of these bacteria. The numerical values in the following table represent the concentration of antibacterial agent, in per cent by weight, required to inhibit completely the growth of the listed organisms in a nutrient medium. For comparison, results are given for dehydroacetic acid, and two other 1.4-pyrone compounds, maltol and kojic acid, as the antibacterial agents.

| Organism | Antibacterial Agent | | |
|---|---|---|---|
|  | Dehydroacetic Acid | Maltol | Kojic Acid |
| Staphylococcus aureus | 0.4 | 2.0 | 1.0 |
| Eberthella typhosa | 0.3 | 1.0 | 1.0 |
| Escherichia coli | 0.4 | 1.0 | 1.0 |
| Bacillus mesentericus | 0.3 | 0.5 | 1.0 |
| Alcaligenes fecalis | 0.3 | 0.3 | 0.3 |
| Bacillus subtilis | 0.3 | 1.0 | 1.0 |
| Pseudomonas aeroginosa | 0.3 | 2.0 | 2.0 |
| Salmonella pullorum | 0.3 | >1.0 | 0.5 |
| Staphylococcus hemolyticus | 0.3 | 0.5 | 1.0 |
| Bacillus megatherium | 0.3 | 1.0 | 1.0 |
| Bacillus cereus | 0.2 | 0.5 | 0.8 |

The foregoing examples have illustrated the manner in which resistance to attack by microorganisms may be imparted to foods rich in carbohydrates by incorporating dehydroacetic acid or its edible salts in the food, as well as by applying dehydroacetic acid to the surface of the food or enclosing the food in a wrapper which contains dehydroacetic acid. This effect has been obtained through the use of amounts of dehydroacetic acid less than 1 per cent (usually less than 0.5 per cent and often less than 0.1 per cent) of the weight of the food. In no case was the color, odor or taste of the food altered by the treatment.

The treatment of proteinaceous and fatty foods with dehydroacetic acid or its salts is the subject of our concurrently filed application, Serial No. 721,878. The use of the same agents in the treatment of light alcoholic beverages is disclosed and claimed in another of our concurrently filed applications, Serial No. 721,879. Antifungal wrapping sheets containing these agents form the subject matter of yet another application filed by us concurrently herewith, Serial No. 721,880.

We claim:

1. The method of imparting to foods rich in carbohydrates an increased resistance to attack by microorganisms which comprises bringing into contact with such foods a compound selected from the class consisting of dehydroacetic acid and its sodium, potassium, ammonium and calcium salts.

2. The method of imparting to foods rich in carbohydrates an increased resistance to attack by microorganisms which comprises incorporating in the food a minor but effective amount of a compound selected from the class consisting of dehydroacetic acid and its sodium, potassium, ammonium and calcium salts.

3. The method of imparting to foods rich in carbohydrates an increased resistance to attack by microorganisms which comprises applying to the surface of the food a minor but effective amount of a compound selected from the class consisting of dehydroacetic acid and its sodium, potassium, ammonium and calcium salts.

4. The method of imparting to foods rich in carbohydrates an increased resistance to attack by microorganisms which comprises enclosing the food in a wrapper containing an effective amount of a material selected from the class consisting of dehydroacetic acid and its sodium, potassium, ammonium and calcium salts.

5. The method of imparting to foods rich in carbohydrates an increased resistance to attack by microorganisms which comprises bringing dehydroacetic acid into contact with such foods.

6. The method of imparting to foods rich in carbohydrates an increased resistance to attack by microorganisms which comprises incorporating a minor but effective amount of dehydroacetic acid in the food.

7. The method of imparting to foods rich in carbohydrates an increased resistance to attack by microorganisms which comprises applying a minor but effective amount of dehydroacetic acid to the surface of the food.

8. The method of imparting to foods rich in carbohydrates an increased resistance to attack by microorganisms which comprises enclosing the food in a wrapper containing an effective amount of dehydroacetic acid.

9. The method of imparting to breadstuffs an increased resistance to attack by microorganisms which comprises bringing the breadstuffs into contact with a minor but effective amount of dehydroacetic acid.

10. The method of imparting to breadstuffs an increased resistance to attack by microorganisms which comprises incorporating dehydroacetic acid in the dough before baking, in an amount sufficient to inhibit mold growth on the baked bread but insufficient to prevent the unbaked bread from rising.

11. The method of imparting to breadstuffs an increased resistance to attack by microorganisms which comprises enclosing the bread in a wrapper containing an effective amount, up to about 5 per cent by weight of the wrapper, of a compound selected from the group consisting of dehydroacetic acid and its sodium, potassium, ammonium and calcium salts.

12. A prepared food, containing at least 50 per cent of carbohydrate based on the weight of food solids present, in contact with up to about 1 per cent of its weight of a compound selected from the class consisting of dehydroacetic acid and its sodium, potassium, ammonium and calcium salts.

13. As an article of manufacture, a raised and baked loaf of bread containing sufficient dehydroacetic acid to impart to the loaf resistance to the growth of microorganisms.

14. Baked bread, enclosed in a wrapper containing an antifungal amount, up to about 5 per cent of the weight of the wrapper, of dehydroacetic acid.

GERALD H. COLEMAN.
PAUL A. WOLF.

REFERENCES CITED

The following references are of record in the file of this patent:

UNITED STATES PATENTS

| Number | Name | Date |
|---|---|---|
| 2,127,879 | Martin | Aug. 23, 1938 |
| 2,157,633 | Schapiro | May 9, 1939 |
| 2,229,204 | Boese | Jan. 21, 1941 |
| 2,265,522 | Farkas | Dec. 9, 1941 |
| 2,374,620 | Prinz | Apr. 24, 1945 |

FOREIGN PATENTS

| Number | Country | Date |
|---|---|---|
| 115,695 | Australia | Aug. 6, 1942 |

OTHER REFERENCES

Ind. Eng. Chem., vol. 32, pages 16-22, 1940, article by A. B. Boese, Jr.